(12) United States Patent
Serebrianyi et al.

(10) Patent No.: US 12,493,542 B2
(45) Date of Patent: Dec. 9, 2025

(54) CALL STACK PROFILING WITH HARDWARE-ASSISTED CALL PATH SIGNATURE GENERATION

(71) Applicant: Google LLC, Mountain View, CA (US)

(72) Inventors: Konstantin Serebrianyi, Palo Alto, CA (US); Xinliang David Li, Palo Alto, CA (US); Alexey Alexandrov, Mountain View, CA (US)

(73) Assignee: Google LLC, Mountain View, CA (US)

( * ) Notice: Subject to any disclaimer, the term of this patent is extended or adjusted under 35 U.S.C. 154(b) by 317 days.

(21) Appl. No.: 18/124,939

(22) Filed: Mar. 22, 2023

(65) Prior Publication Data
US 2024/0273007 A1 Aug. 15, 2024

Related U.S. Application Data

(60) Provisional application No. 63/483,830, filed on Feb. 8, 2023.

(51) Int. Cl.
*G06F 11/362* (2025.01)
(52) U.S. Cl.
CPC ........ *G06F 11/3636* (2013.01); *G06F 11/366* (2013.01)
(58) Field of Classification Search
None
See application file for complete search history.

(56) References Cited

U.S. PATENT DOCUMENTS

| 11,429,515 B1 | 8/2022 | Bartling et al. | |
| 11,755,446 B1* | 9/2023 | Agarwal | G06F 11/3082 717/128 |
| 2003/0005414 A1* | 1/2003 | Elliott | G06F 11/0778 717/130 |
| 2006/0242470 A1 | 10/2006 | McCullough et al. | |
| 2007/0288908 A1* | 12/2007 | Cain | G06F 11/3466 717/130 |
| 2008/0288926 A1* | 11/2008 | Cain, III | G06F 11/3466 717/128 |
| 2008/0301501 A1* | 12/2008 | Grant | G06F 11/079 707/999.102 |
| 2011/0145800 A1* | 6/2011 | Rao | G06F 11/3636 717/133 |

(Continued)

FOREIGN PATENT DOCUMENTS

TW  I528277 B  4/2016

OTHER PUBLICATIONS

Extended European Search Report for European Patent Application No. 23200380.6 dated Feb. 27, 2024. 6 pages.

(Continued)

*Primary Examiner* — Jason D Mitchell
(74) *Attorney, Agent, or Firm* — Lerner David LLP

(57) ABSTRACT

Aspects of the disclosure relate to computing and maintaining stack call signatures with support for fast online stack unwinding. Instead of sampling and unwinding stack frames, a system maintains and updates a separate call path signature for each sampled frame. The call path signature encodes the contents of each frame of a stack of frames forming a call path. A call path "summary" stack is maintained and processed from the bottom-up to recreate the full stack corresponding to a sampled frame.

18 Claims, 18 Drawing Sheets

(56) References Cited

U.S. PATENT DOCUMENTS

| | | | |
|---|---|---|---|
| 2015/0058825 A1 | 2/2015 | Madampath | |
| 2017/0280307 A1* | 9/2017 | Hosie | H04W 4/16 |
| 2017/0322861 A1* | 11/2017 | Chan | G06F 9/5005 |
| 2017/0322877 A1* | 11/2017 | Chan | G06F 11/3037 |
| 2020/0371809 A1* | 11/2020 | Niu | G06F 9/4484 |
| 2021/0011717 A1* | 1/2021 | Lin | G06F 11/0778 |
| 2021/0109844 A1* | 4/2021 | Allyn | G06F 11/3037 |
| 2021/0200593 A1* | 7/2021 | Allyn | G06F 9/5022 |
| 2021/0334139 A1* | 10/2021 | Chan | H04L 41/5009 |
| 2022/0392486 A1* | 12/2022 | Binnamangala Prabhu | G06F 3/061 |

OTHER PUBLICATIONS

Mihajlovic, B., et al., "Architecture-Aware Real-Time Compression of Execution Traces", ACM Transactions on Embedded Computing Systems, vol. 14, No. 4, Article 75, Sep. 2015. pp. 1-24.

\* cited by examiner

| 1 | path_signatures = sort(path_signatures) on depth # Make a copy for later use |
|---|---|
| 2 | while path_signatures is not empty: |
| 3 | path_signature = path_signatures.pop() |
| 4 | full_stacks{path_signature.path_hash} = path_signature.ret0 |
| 5 | depth = 2 |
| 6 | while depth is not equal to max depth: |
| 7 | while path_signatures is not empty # use copy |
| 9 | path_signature = path_signatures.pop() |
| 10 | parent_hash = path_signature.path_hash ^ path_signature.ret0 |
| 11 | parent_stack = full_stacks{parent_hash} |
| 12 | full_stacks{path_signature.path_hash} = {path_signature.ret0} + parent_stack |

FIG. 4

CALL STACK PROFILING WITH HARDWARE-ASSISTED CALL PATH SIGNATURE GENERATION

CROSS-REFERENCE TO RELATED APPLICATIONS

This application claims the benefit under 35 U.S.C. § 119(e) of the filing date of U.S. Patent Application No. 63/483,830, for "CALL STACK PROFILING WITH HARDWARE-ASSISTED CALL PATH SIGNATURE GENERATION, which was filed on Feb. 8, 2023, and which is incorporated here by reference.

BACKGROUND

A call stack is a data structure that stores information about the execution of computer software. Software includes programs with multiple subroutines—also referred to as methods or functions, etc. Systems executing software maintain and update return addresses in the call stack to ensure execution of the software in the correct order. A call stack is populated with call stack frames. Call stack frames can store variables, parameters, or other temporary values corresponding to the execution of a respective function or subroutine being executed. A call stack frame includes a return address pointing to the instruction right after the call instruction to the callee function. A call stack profiler examines the call stack to generate analytics for the computer program. The analytics can be used to make improvements to the execution and performance of the computer program.

A call stack profiler can sample some or all the contents of a call stack at a point in execution of corresponding software. The time required for a call stack profiler to sample a call stack varies based on the number of samples taken and the average call stack depth of each sample. The call stack depth of a frame is the number of calls made during the execution of a program before reaching the function corresponding to the frame. Call stacks for large, complex, programs require increasingly more time to profile versus smaller, less complex, programs. In addition, for programs with a high average call stack depth and high number of unique call paths, the memory requirement for a profiler to successfully profile these types of programs also increases.

BRIEF SUMMARY

Aspects of the disclosure relate to computing and maintaining stack call signatures with support for fast online stack unwinding. Instead of sampling and unwinding stack frames, a system maintains and updates a separate call path signature for each current call stack. The call path signature encodes the contents of each frame of a stack of frames forming a call path. A call path "summary" stack is maintained and can be processed offline from the bottom-up to recreate the full stack corresponding to a stack sample.

One aspect of the disclosure provides for a method, including receiving, by one or more processors, one or more call path signatures, each call path signature corresponding to a respective call stack sample; sorting, by the one or more processors, the one or more call path signatures according to the depth of the call path for each call stack frame corresponding to a received call path signature; and for each of the sorted one or more call path signatures: generating, by the one or more processors, a parent call path hash value using a return address and a call path hash value in the call path signature, generating, by the one or more processors, using the parent call path hash value, a parent call path for a parent call stack frame appearing before the call stack frame in the call path, and generating, by the one or more processors, a call path for the call stack frame using the parent call path and the return address of the respective call stack frame.

Other implementations of this aspect include corresponding computer systems, apparatus, and computer programs recorded with one or more computer-readable storage media, each configured to perform the actions of the methods.

One aspect of the disclosure provides for a method, including during the execution of a computer program, generating, by one or more processors, one or more call path signatures each corresponding to a respective call stack frame in a call stack generated during the execution of the computer program, wherein a call path signature includes: a call path hash generated using a hash function applied on the return addresses of call stack frames earlier in the respective call path for the call stack frame, a return address for the respective call stack frame, and a depth count of the respective call path for the call stack frame; and after the execution of the computer program, causing, by the one or more processors, the generation of the call path for each of the one or more call path signatures, using the respective call path hash, return address, and depth count of each of the one or more call path signatures.

The foregoing and other implementations can each optionally include one or more of the following features, alone or in combination. One implementation includes all the following features in combination.

The call path signature includes a call path hash value.

Generating the parent call path hash value includes generating the parent call path hash value in bottom-up order relative to frames in the call stack.

The call path hash value is generated using the return address of the respective call stack frame and return addresses of call stack frames in the call path in the call stack leading to the respective call stack frame.

The method further includes generating, by the one or more processors, the call stack for each of the one or more sorted call path signatures beginning with the call path signature corresponding to the call stack frame with the smallest call stack depth.

The call path hash value is generated using a hash function with the property of being able to be unwound using the return address of a call stack frame.

A call path signature includes: the call path hash value for the respective call stack frame; the return address of the respective call stack frame; and a depth count corresponding to the depth of the call path leading to the respective call stack frame.

Receiving the one or more call path signatures includes sampling, by the one or more processors, the one or more call path signatures during execution of a computer program using the call stack.

Generating, by the one or more processors, the call stack for each of the one or more call path signatures during or after the execution of the computer program.

The one or more call path signatures are each stored as a tuple of values with a predetermined maximum memory requirement.

Generating the one or more call path signatures includes generating the one or more call path signatures during the execution of the computer program.

Causing the generation of the call path for each of the one or more call path signatures includes causing, by the one or more processors, the generation of the call path for each of the one or more call path signatures after the execution of the computer program.

The method further includes maintaining, by the one or more processors, the call path hash of the top-most call stack frame in the call stack in memory; and generating, by the one or more processors, a call path signature using the call path hash maintained in memory.

The method further includes retrieving the return address and the depth count of a call stack frame from a shadow stack, wherein the shadow stack is a hardware-implemented stack maintained independently of the call stack.

BRIEF DESCRIPTION OF THE DRAWINGS

FIG. 4 is a pseudocode snippet of an example implementation of the process for offline computation of a call stack.

DETAILED DESCRIPTION

Overview

Figure 1:
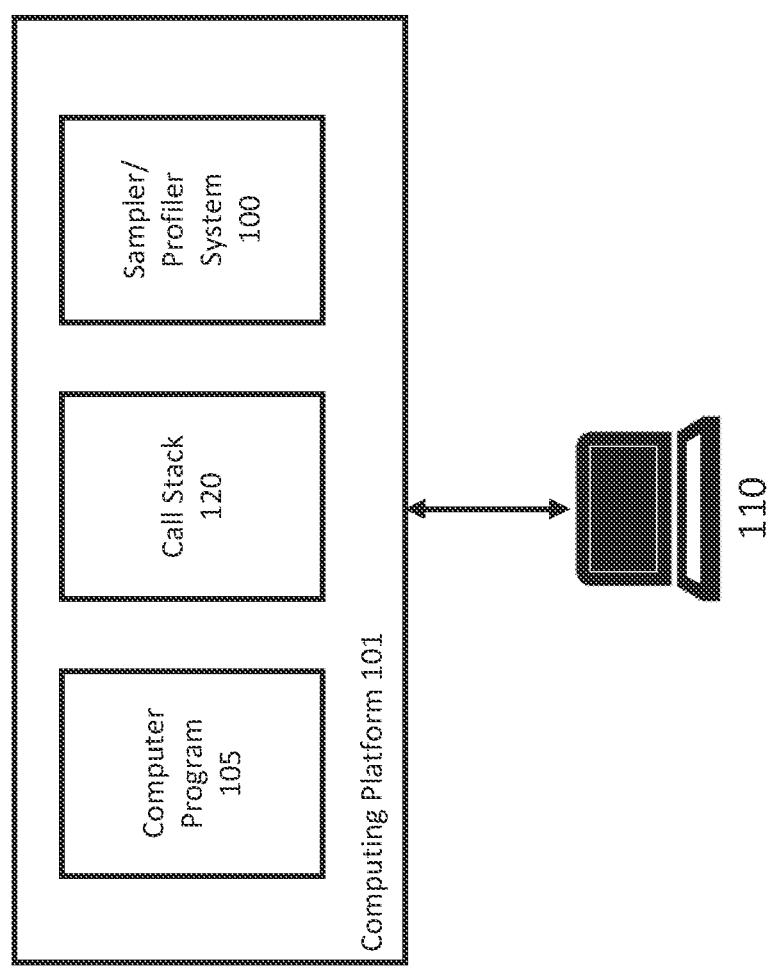
FIG. 1 is a block diagram of an example sampling and profiling system, according to aspects of the disclosure.

Aspects of the disclosure provide for sampling and retrieving the contents of a call stack using stack signatures that can be processed to retrieve the stack frames in time proportional to the number of sampled stack signatures. A stack signature is a tuple of data corresponding to a stack frame of a call stack. A stack signature includes a hash of the return addresses of the call path leading to the stack frame, the return address to the next line executed after the function call causing the generation of the stack frame, and a count of the depth of the call path leading to the stack frame.

A system configured as described herein can generate a stack signature for each stack frame generated during the execution of functions and subroutines of an executing computer program. The system generates the hash of the call path such that the hash can be "wound" and "unwound." A call path hash is wound when the system adds an additional return address to the call path hash and is unwound when a return address is removed from the call path hash.

A system configured as described herein can retrieve the contents of a call stack through an online process and an offline process. In the online process, stack signatures are generated for call stack frames of a call stack. In the offline process, the system processes one or more sampled call path signatures to retrieve the original contents of the corresponding stack frames. To do so, the system orders the call path signatures by the depth size of the call path. Beginning with the smallest depth size, the system unwinds the call path hash of each stack signature, using the return address included in the stack signature, as well as the unwound contents of the previously processed call path signature, if any.

Unwound call path signatures can be profiled to retrieve information corresponding to the sampled call stack frames. A profiler, e.g., the system according to aspects of the disclosure, can use the collected data to monitor the execution of the computer program, for example to identify potential errors or bugs, or points of inefficiency. More sampled frames can result in higher precision profiles, which in turn can be used to drive more informed improvements to the executing computer program.

Aspects of the disclosure provide for computing and maintaining call path signatures for online stack unwinding. Aspects of the disclosure can provide for at least the following technical advantages. A system configured as described herein can perform call stack profiling in linear time relative to the number of samples. The entire stack trace of an executing program can be represented through call path signatures that are each one or two eight bytes long, for example. Improved call stack profiling as described herein can provide for more frequent sampling and profiling, because the computational overhead to do so is reduced. More frequent sampling can allow for improved profile precision because more data is available to a profiler.

Call stack sampling and profiling as described herein can enable contextual profiling of a computer program during run time. Contextual profiling is profiling that is dependent on the current state of the computer program during execution. Where other approaches are too computational and/or memory intensive to be performed during runtime of a computer program, aspects of the disclosure can be performed during runtime, as the only online component is generating and sampling call path signatures.

Retrieving dynamic context through call stack profiling can enable a wide range of scenario-based optimizations. A scenario-based optimization is a procedure that can be implemented to improve the execution of a computer program. For example, a compiler optimizer may be configured to perform a scenario-based optimization upon receiving an indication from a profiler. The scenario-based optimizations may be sub-routines that are turned off by default, for example, because their use only improves performance of the executing computer program under certain circumstances. Scenario-based optimizations can also include generating conditional code based on the generated profile of a call stack meeting or not meeting predetermined conditions. The potential computational gains according to aspects of the disclosure can allow for these scenario-based optimizations where otherwise the performance gains are erased by the overhead in sampling and profiling a call stack during runtime of the computer program.

The memory requirement for the generated call path signatures is proportional only to the number of unique call paths for call stack frames in the call stack and does not vary with the depths of the call paths of each call stack frame. Representing call stack frames as call path signatures is also computationally less expensive, e.g., measured in clock cycles or wall-clock time, over approaches using other types of data structures, such as hash tables. For example, storing call stack frame data in a hash table is dependent on both the number of sampled call stack frames, as well as the average call path depth of the sampled call stack frames. This increased computational complexity is at least due to the load and multiple multiplication instructions required in hashing and comparing each entry of the hash table against an input.

The system can also perform call path runtime identifications in constant time instead of in time linear to the depth of the call stack. A profiler as described herein can sample a call stack with a runtime complexity scaling as a function of the number of samples taken, as opposed to traditional profilers that scale as the multiplication of the number of samples and the average call stack depth of the call stack.

Context identification can enable improvements for context dependent profiling as well as improvements at runtime, e.g., because less time and/or processing cycles are devoted to call path runtime identifications. Aspects of the disclosure allow for sampling and profiling a call stack while avoiding the perturbation of the executing computer program. Further, cache pollution and memory bandwidth requirement can be reduced, at least because of the avoidance of stack memory scanning and the improvements to the reduced raw size of profile information using call path signatures as described herein.

Example Systems

Figure 7:
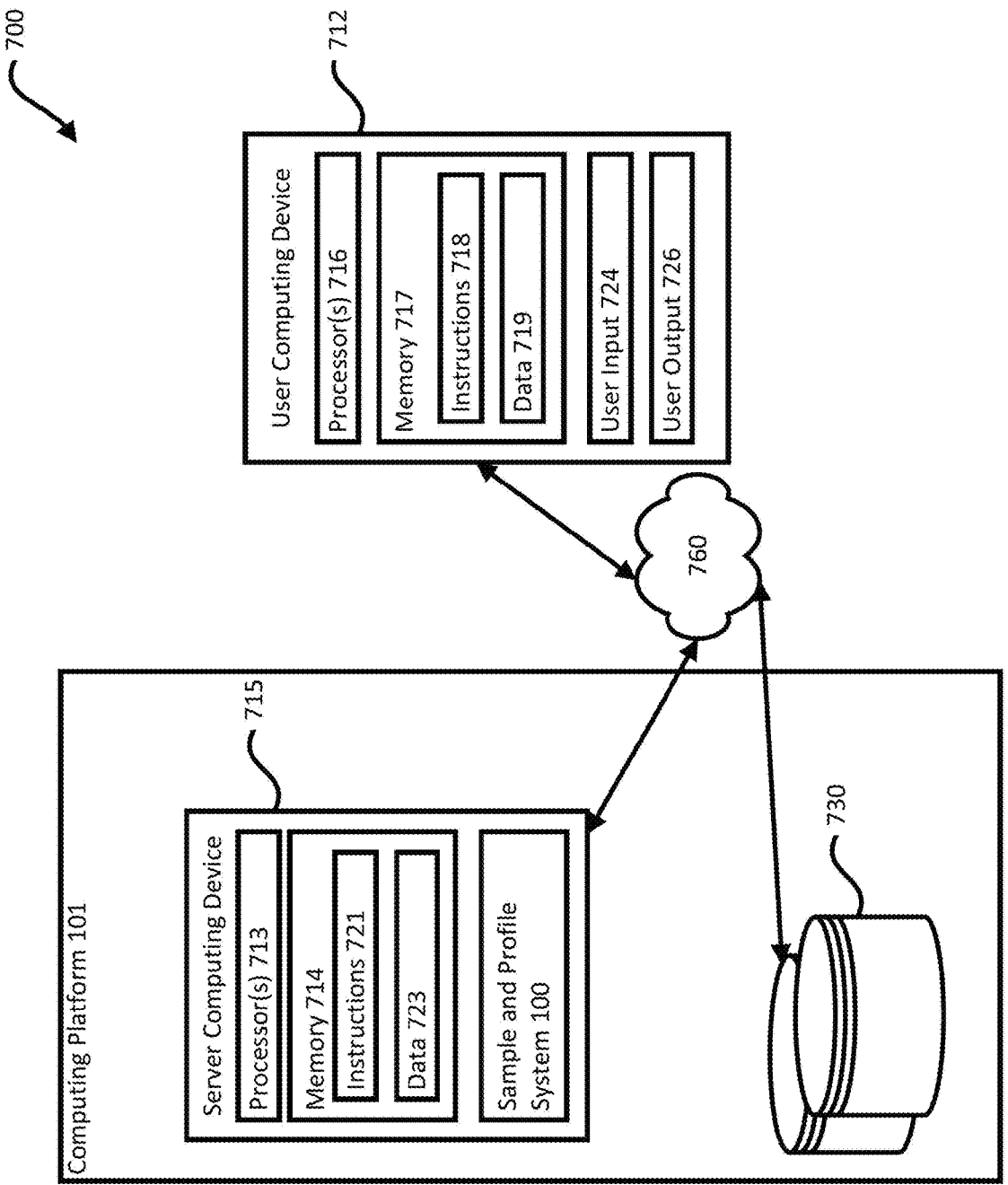
FIG. 7 is a block diagram of an example computing environment including a sampler/profiler system, according to aspects of the disclosure.

FIG. 1 is a block diagram of an example sampling and profiling system 100, according to aspects of the disclosure. A computing platform 101 can include a computer program 105, a call stack 120, and a sampler/profiler system 100. The platform 101 can be in communication with a user computing device 712. FIG. 7 is a block diagram of an example computing environment including a sampler/profiler system, according to aspects of the disclosure.

Computer program 105 can be any computer program executing on the computing platform 101. As the computer program is executing, the platform 101 maintains call stack 120. The stack 120 can be implemented in software and/or in hardware. The stack 120 can be a shadow stack, which is maintained separately from a primary call stack and may be implemented for verifying that the contents of the primary call stack has not been corrupted or tampered with. Return-oriented programming (ROP) and jump-oriented programming (JOP) are two examples of the types of attacks mitigated by maintaining a shadow stack. The stack 120 may be implemented in memory, such as RAM or cache, and/or on a hard drive or other persistent source of data storage. For example, the stack 120 may be implemented in DRAM with an appropriately configured system.

Data can be split across one or more stacks, e.g., a user stack and a shadow stack. Each frame of the stack can include any information related to the call of a corresponding function, including a program counter, values for scoped variables, etc.

The stack 120 can be a return address stack, which is maintained in hardware separately from a mixed data or control stack accessible by at the user level. In some examples, the stack 120 can be split across multiple stacks that manage various aspects of a call frame.

The call stack depth can be chosen based on depth statistics of call stacks generated by executing various computer programs. The data can be used to guide the choice of shadow stack size. For example, if the 95th percentile for call stack depth measured for programs executed over a period is less than 50, the depth of the shadow stack can be defaulted to 64. In other examples, the call stack depth may be chosen based on other factors, such as hardware capability.

A call path signature can be defined as a triple of three values, a top return address of the call stack, the depth of the call stack, and a hash of the call path. The call path is a sequence of memory addresses that can be traced back to return to the first instruction executed by running a program. The top return address is the most recent return address pushed onto the call stack. The depth of the call stack is the quantity of return addresses pushed onto the stack. The hash of the call path is a hash of the return addresses pushed onto the stack.

The hash can be generated using any hash function, e.g., SHA and its variants, cyclic redundancy check (CRC), MD5 and its variants, XOR, cksum, Fletcher's checksum, etc. The return addresses on the stack can be combined according to any scheme that enables unwinding. Unwinding refers to retrieving the hash of a previous call stack frame using the hash of the current call stack frame and the top return address. One example hash scheme that supports unwinding is performing an exclusive or ("XOR") operation on each return address and hashing the result of XOR operations. An example formulation of the hash of the call path can be: hash=$ret_0 \oplus ret_1 \oplus \ldots \oplus ret_n(A)$. In expression (A), ret; refers to the ith return address on the call stack, where $ret_0$ is the top return address. The XOR operation is shown by the symbols $\oplus$ or "+."

The call path signature can be stored using two eight-byte words, in some examples. The top return address can be represented in less than 8 bytes, and the depth can be limited, e.g., to one byte. The path hash can be stored in 8 bytes and in a general or model-specific register.

For each function call, the call path signature can be updated as follows. The hash of the call path is XORed with the memory address following the current call instruction. The top return address is updated to the address after the current call instruction. The depth is incremented by one. An example formulation of a call path signature update can be:

$$\text{hash} = \text{hash} \oplus \langle \text{address\_after\_call\_instruction} \rangle \quad (B)$$

$$ret_0 = \langle \text{address\_after\_call\_instruction} \rangle \quad (C)$$

$$\text{depth} = \text{depth} + 1 \quad (D)$$

Expression (B) shows the call stack hash being set to itself XORed with the address after the current call instruction, indicated as <address_after_call_instruction>. Expression (C) shows the top return address $ret_0$ being set to the address after the current call instruction. Expression (D) shows the depth of the call stack being set to itself plus one.

For unwinding the stack frame-by-frame, the hash of the call path can be XORed with the top return address to remove the top return address from the stack. This is possible because of the property of the XOR operation, e.g., due to $ret_0 \oplus ret_1 \oplus ret_0 = ret_1$. The top return address is set to the return address of the frame in the call stack immediately after the current frame on top of the stack. The depth is also reduced by one, to reflect the shrink in the call stack. An example formulation of a call path signature update after the execution of a return instruction can be:

$$\text{hash} = \text{hash} \oplus ret_0 \quad \text{(E)}$$

$$ret_0 = \langle \text{return\_address\_of\_parent\_frame} \rangle \quad \text{(F)}$$

$$\text{depth} = \text{depth} - 1 \quad \text{(G)}$$

Expression (E) shows the call stack hash being set to itself XORed with the top return address $ret_0$. Expression (F) shows the top return address $ret_0$ being set to the return address of the frame in the call stack immediately after the current frame on top of the stack, indicated as <return_address_of_parent_frame>. Expression (G) shows the depth of the call stack being set to itself minus one.

Although XOR is described as part of the hashing scheme, other schemes are possible. For example, XOR with rotation may be used. Using XOR with rotation can be helpful, for example, for capturing cycles due to recursive calls. In this scheme, when a new frame is pushed to the call stack, the hash of the call path is updated by first rotating the old call path hash and then XORing the rotated hash with the current return address. To unwind, the previous hash is computed by XOR followed by a rotation in the opposite direction. An example call path signature update using a rotated XOR can be:

$$\text{hash} = \text{rotate\_1}(\text{hash}) \oplus \langle \text{address\_after\_call\_instruction} \rangle \quad \text{(H)}$$

$$ret_0 = \langle \text{address\_after\_call\_instruction} \rangle \quad \text{(I)}$$

$$\text{depth} = \text{depth} + 1 \quad \text{(J)}$$

Expression (H) is like expression (B), except that the hash is rotated once, indicated by the rotate_1( ) function. Expressions (I) and (J) are the same as expressions (C) and (D).

An example formulation of a call path signature update after the execution of a return instruction and using the rotated XOR scheme can be:

$$\text{hash} = \text{reverse\_rotate}(\text{hash}) \oplus ret_0 \quad \text{(K)}$$

$$ret_0 = \langle \text{return\_address\_of\_parent\_frame} \rangle \quad \text{(L)}$$

$$\text{depth} = \text{depth} - 1 \quad \text{(M)}$$

Expression (K) is like expression (E), except that the hash is rotated once in reverse relative to the rotate_1( ) function, indicated by the reverse_rotate( ) function. Expressions (L) and (M) are the same as expressions (F) and (G).

To support automatic updating of the summary stack, e.g., when a function returns or after computing the new $ret_0$ value, a fixed size internal shadow stack closer to the CPU than RAM can be used. For example, the size overhead per-core for the summary stack allows the summary stack to co-locate the shadow stack with the L1 cache.

In some examples, the size overhead of the shadow stack can be reduced using an address compressing scheme. Delta encoding is one example, because the maximal distance between two functions is limited by the offset length in the instruction encoding. If frames in the call stack are numbered with 0 from the top of stack, instead of storing return address for a particular frame, the difference between the return address of a later frame and the current frame is stored instead. The top of the stack has a value of $ret_1 - ret_0$, so unwinding the stack requires adding this value with $ret_0$ to update the summary stack. To further reduce the size, the lower k bits can be dropped, assuming $2^k$ alignment.

Figure 2A:
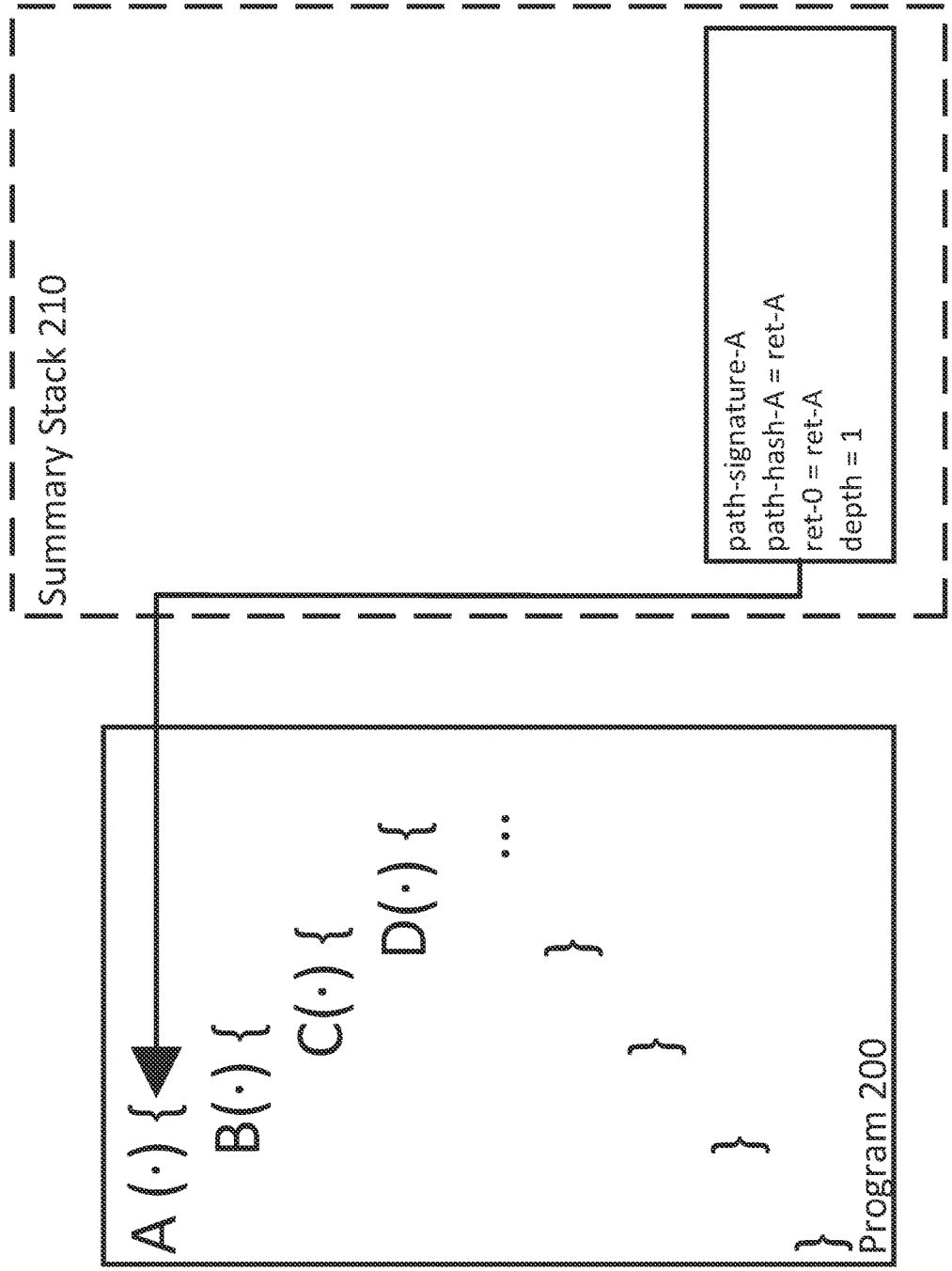
FIGS. 2A-2D are diagrams illustrating the example generation of a summary stack of call path signatures, according to aspects of the disclosure.

FIGS. 2A-2D are diagrams illustrating the example generation of a summary stack of call path signatures, according to aspects of the disclosure. In one example, program 200 is executed with functions A, B, C, and D. Function A is the outermost function and includes function B. Function B includes function C and Function C includes function D. Summary Stack 210 is initially empty (not shown). In FIG. 2A, a system executes function A, which is added to the call stack. The system, in addition to adding a call stack frame to its call stack, generates and pushes path signature A (path-signature-A in FIGS. 2A-2D) to the summary stack 210. Path signature A is defined as described herein, including a path hash value (path-hash-A in FIGS. 2A-2D), a top return address (ret-A in FIGS. 2A-2D) and a depth value of 1.

Figure 2B:
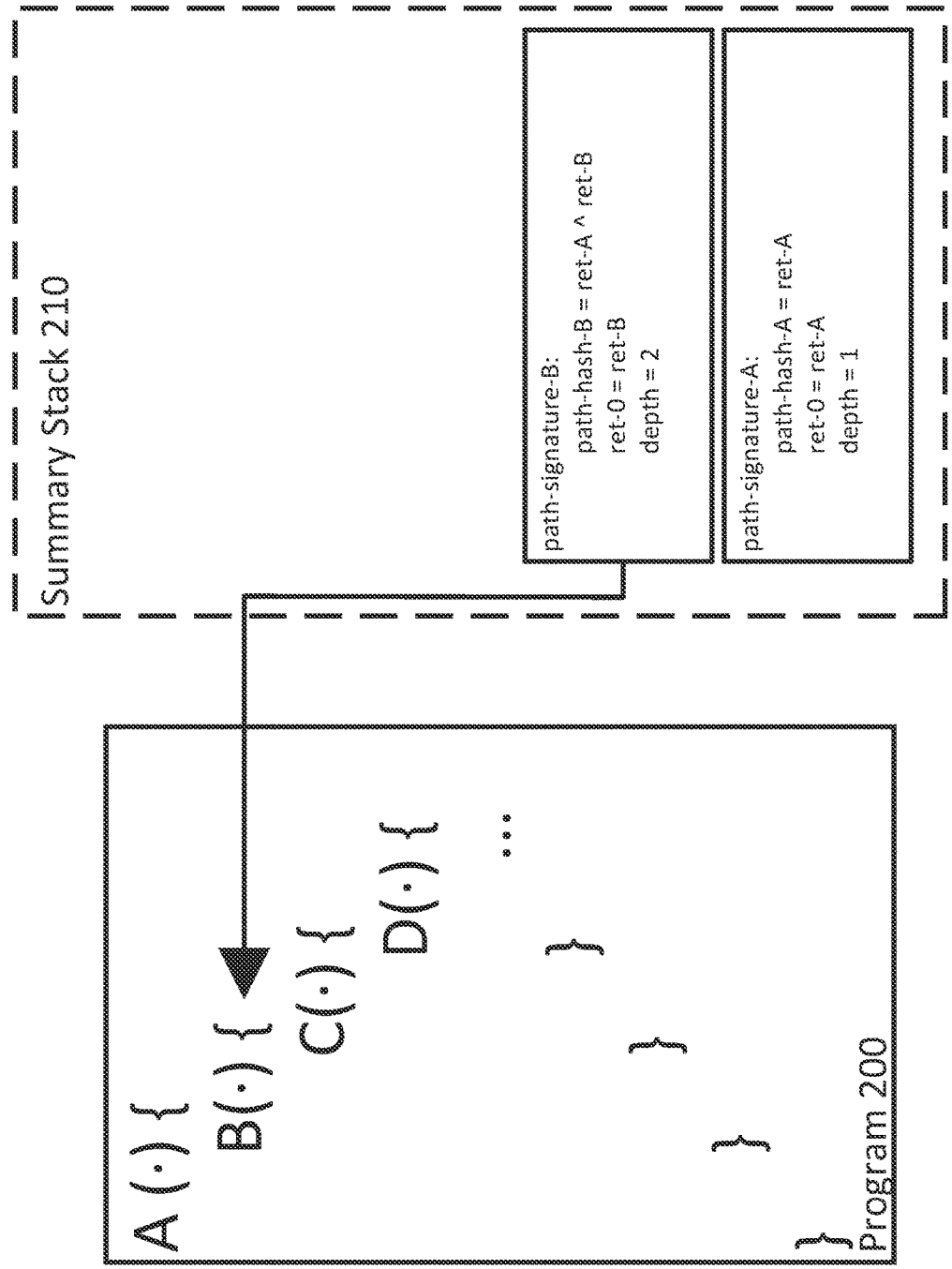

In FIG. 2B, the system invokes function B, pushing another frame to the call stack. The system generates and pushes path signature B (path-signature-B in FIGS. 2B-2D). The path hash value for path signature B is the result of a XOR operation between the top addresses for path signatures A and B. The XOR operation is represented by the concatenation symbol ("+"). The depth is also incremented relative to the previous depth value.

Figure 2C:
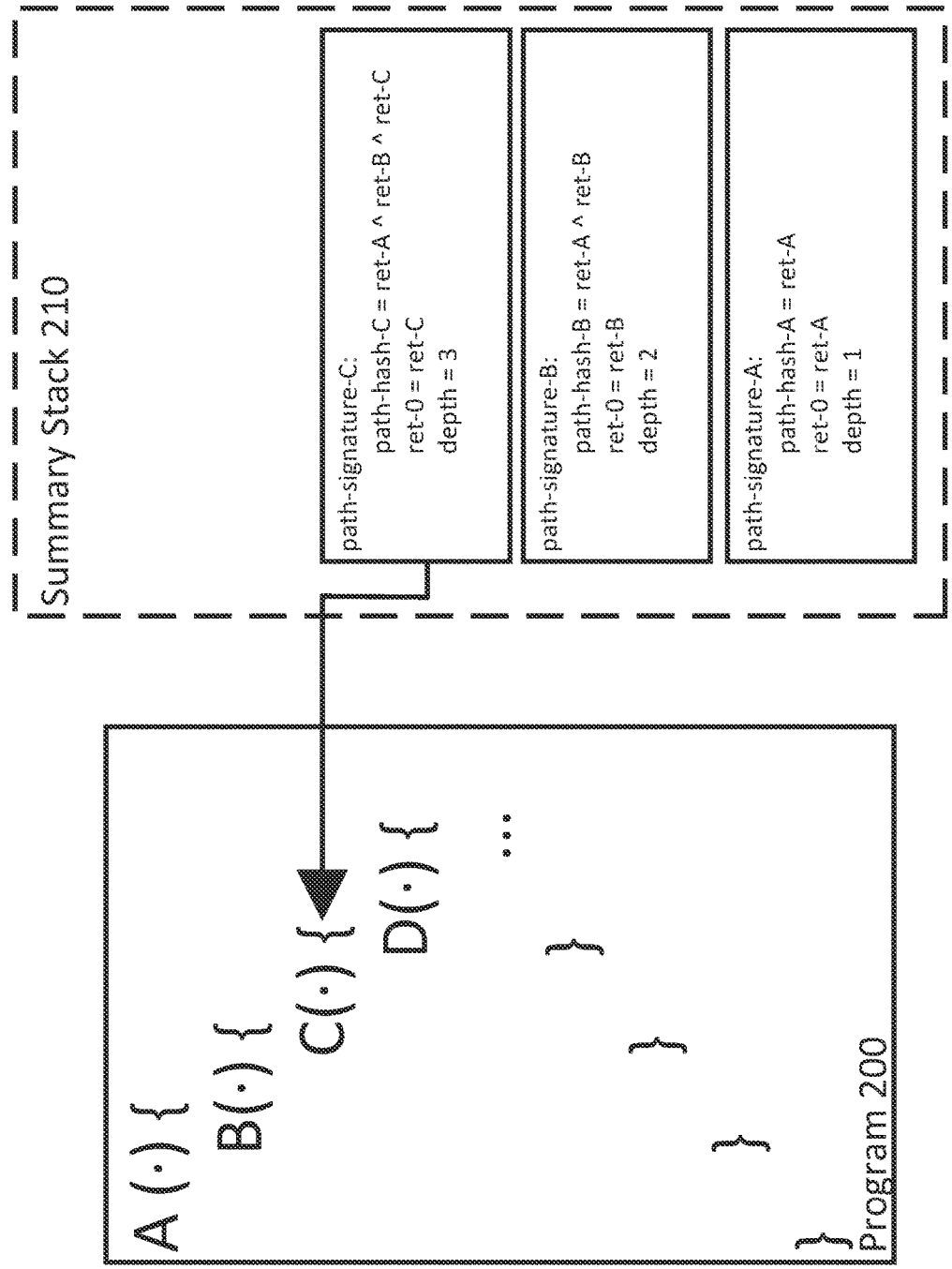
Figure 2D:
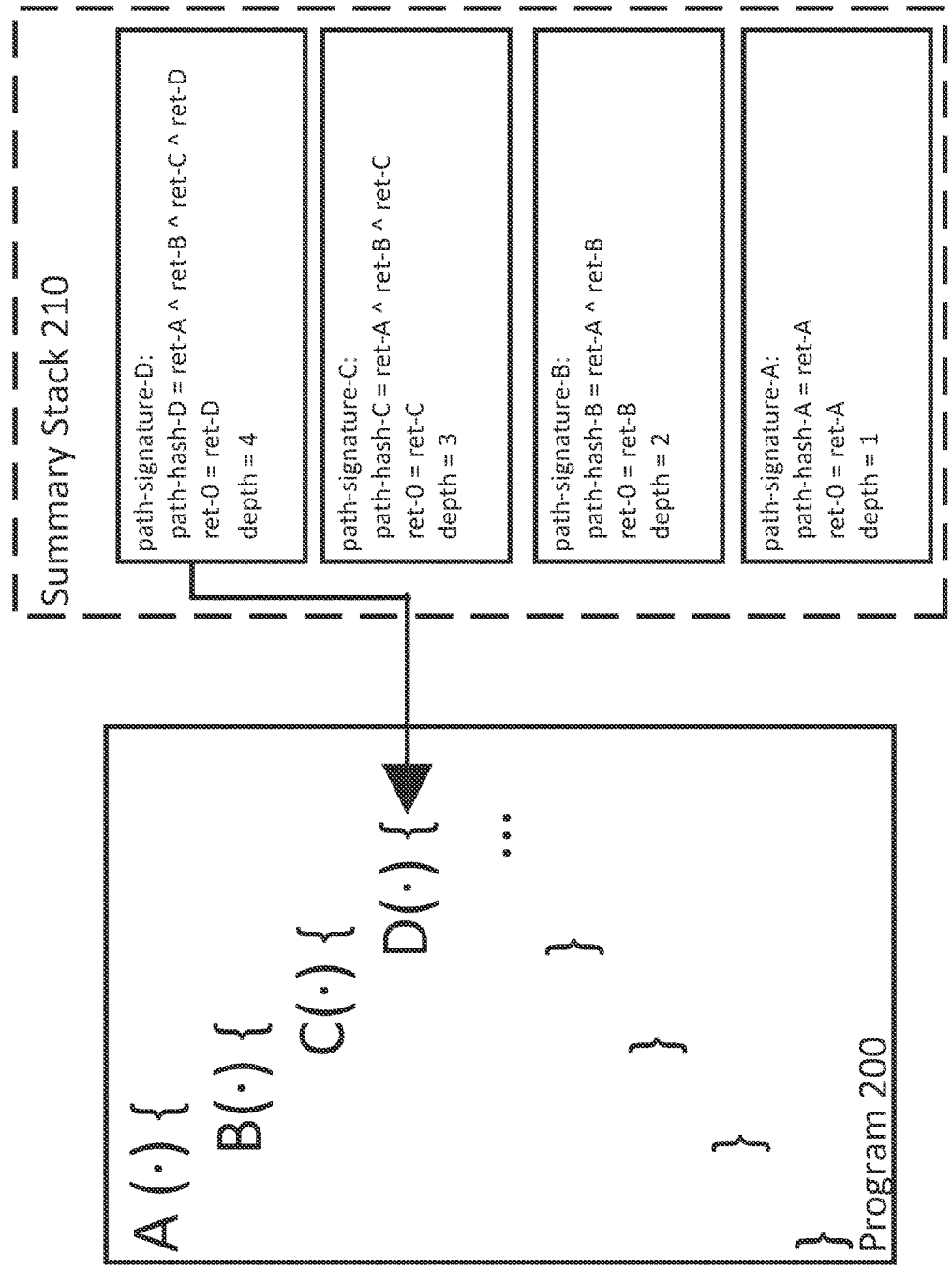

In FIG. 2C, the system invokes function C, pushing another frame to the call stack. The system generates and pushes path signature C (path-signature-C in FIGS. 2C-2D). The path hash value for path signature C is the result of a XOR operation between the top addresses for path signatures A, B, and C. In FIG. 2D, the system invokes function D, pushing another frame to the call stack. The system generates and pushes path signature D. The path hash value for path signature D is the result of a XOR operation between the top addresses for path signatures A, B, C, and D.

Example Methods

Following creation and management of call path signatures, stack walking is eliminated in the online portion of the stack profiling, with only the path signature of a frame being sampled and stored in memory. As described herein with reference to FIGS. 3A-3B, a separate, offline, process is performed by the system to reconstruct the full stack of call stack frames for each sampled call path signature. The runtime complexity of the process is linear relative to the number of samples.

The offline process processes a stack of sorted path signatures in bottom-up order, e.g., starting in the order with call stack depth one. For each path signature of depth k, the system can reconstruct the full stack for the path signature by unwinding the stack one frame and adding the result to a fully computed stack with depth k-1.

Figure 3A:
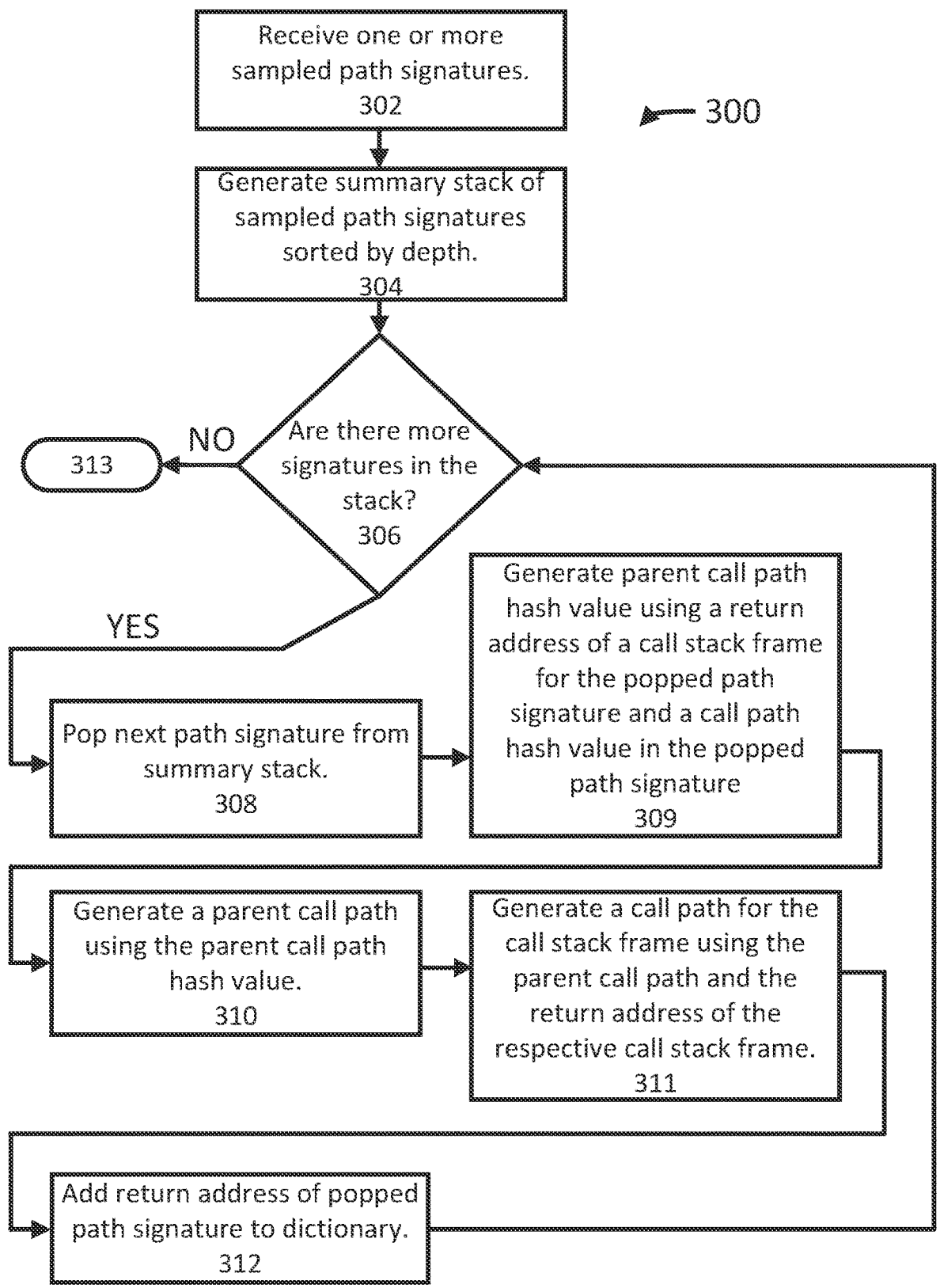
FIGS. 3A-3B are flow diagrams of an example process for offline computation of a call stack from sampled call path signatures, according to aspects of the disclosure.
Figure 3B:
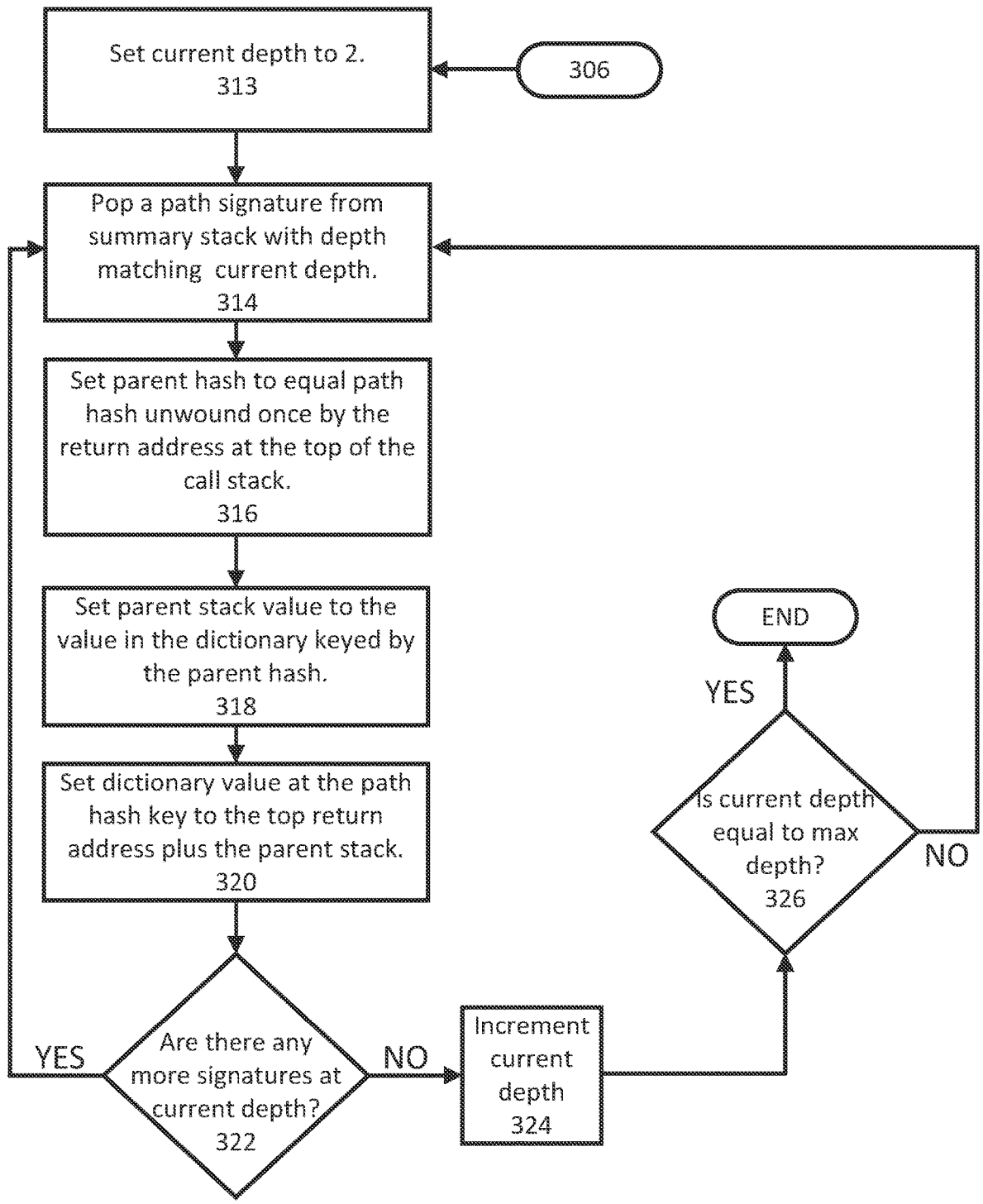

FIGS. 3A-3B are flow diagrams of an example process 300 for offline computation of a call stack from sampled call path signatures, according to aspects of the disclosure.

The example processes described herein may be performed by a device or system including one or more processors. In some examples, processes described in this specification may be performed by the system 100 described herein with reference to FIG. 1. Although some steps of the processes are described as being performed in a particular order, in some examples different steps may be added, removed, modified and/or be performed in parallel or sequentially. Further, although reference is made to a single system, it is understood that the processes can be repeated multiple times and/or by multiple different processors on the same or different systems.

Blocks 300-312 of the process 300 outputs a dictionary or other data structure of return addresses for each of a list of sampled path signatures. The dictionary, referred to as "full_stacks" herein, is then processed according to blocks 313-326 to reproduce the full contents of frames corresponding to each sampled path signature.

The sampled path signatures can be a list of any length, up to the number of frames in the call stack being profiled. Each sampled path signature can include a hash, parent frame return address, and stack depth (path hash, $ret_0$, depth) as shown and described herein with reference to 2A-2D. Each sampled path signature can be wrapped in a larger data container and include other information, such as the program counter of the top frame being sampled. A sampled path signature and its program counter can form a summary stack sample. In receiving the one or more call path signatures, the system is configured to sample the one or more call path signatures during the execution of a computer program using the call stack.

The system generates a summary stack of sampled path signatures sorted by depth, according to block 304. The summary stack is processed until the summary stack is empty, as described presently. For performing operations later in the process 300, the system can maintain a copy of the initial summary stack before popping sampled frames off the stack.

The system checks whether there are more signatures in the summary stack, according to decision block 306. If the summary stack is empty ("NO"), the process proceeds to block 313. If there are more signatures in the summary stack ("YES"), the system pops the next path signature from the summary stack, according to block 308.

The system generates a parent call path using the parent call path hash value, according to block 309. The system generates a call path for the popped call stack frame using the parent call path and the return address of the popped call stack frame, according to block 310. The system adds the return address ($ret_0$) of the popped path signature to a dictionary, according to block 312. The dictionary or other data structure is a collection of key-value pairs, in which the return address from the popped stack signature is the value, and the key references the path signature from which the return address is set. The system repeats the actions according to blocks 306-312 until the summary stack is empty.

The full_stacks dictionary contains, for each sampled frame, the hashed contents of the call path to the sampled frame. Blocks 313-326 of the process 300, when performed by the system, causes the system to retrieve the full contents of the call path of each sampled frame.

According to block 313, the system sets a variable tracking the current depth to 2. The current depth is tracked for correctly unwinding the contents of a sampled frame having a call path matching the current depth. The current depth for unwinding sampled frames is initially set to 2 because sampled frames with a depth of 1 do not need to be unwound.

The system pops from the summary stack a path signature with a depth matching the current depth, according to block 314. The system can sort the summary stack beforehand, as described and according to block 304. As also noted with reference to block 304, the system can maintain a copy of the initial sorted summary stack.

The system sets the current parent hash equal to the path hash of the popped signature unwound once by the return address at the top of the call stack, according to block 316. Any of a variety of different hash functions may be used, e.g., XOR, cksum, SHA, Fletcher's checksum, CRC, etc. For example, If XOR is used for winding and unwinding as described herein, the operation according to block 316 can be performed according to the following:

$$\text{parent\_hash} = \text{path\_hash} \oplus ret_0 \qquad (N)$$

where path_hash and $ret_0$ are taken from the path signature popped according to block 313. The use of XOR as the hash function is understood to be an example and not the only hash function that can be used according to aspects of the disclosure. Other examples include SHA and its variants, cyclic redundancy check (CRC), MD5 and its variants, XOR, cksum, Fletcher's checksum, etc.

FIG. 4 is a pseudocode snippet 400 of an example implementation of the process 300. The path_signatures data structure can be the summary stack. The full_stacks data structure can be the dictionary used to store the hashes for each sampled frame.

Figure 5A:
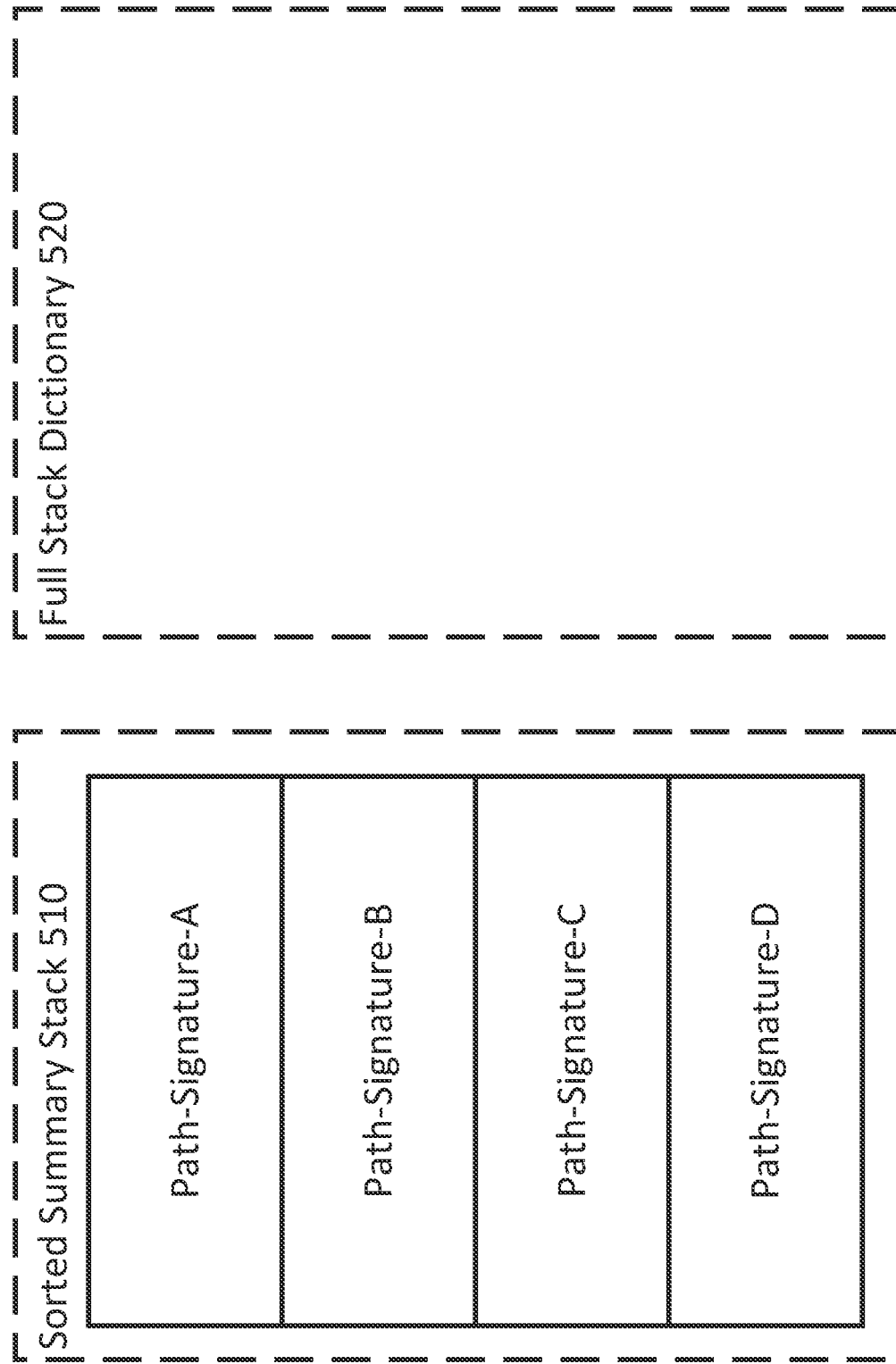
FIGS. 5A-5C are diagrams illustrating an example execution of blocks of the example process for offline computation of a call stack, according to aspects of the disclosure.
Figure 5B:
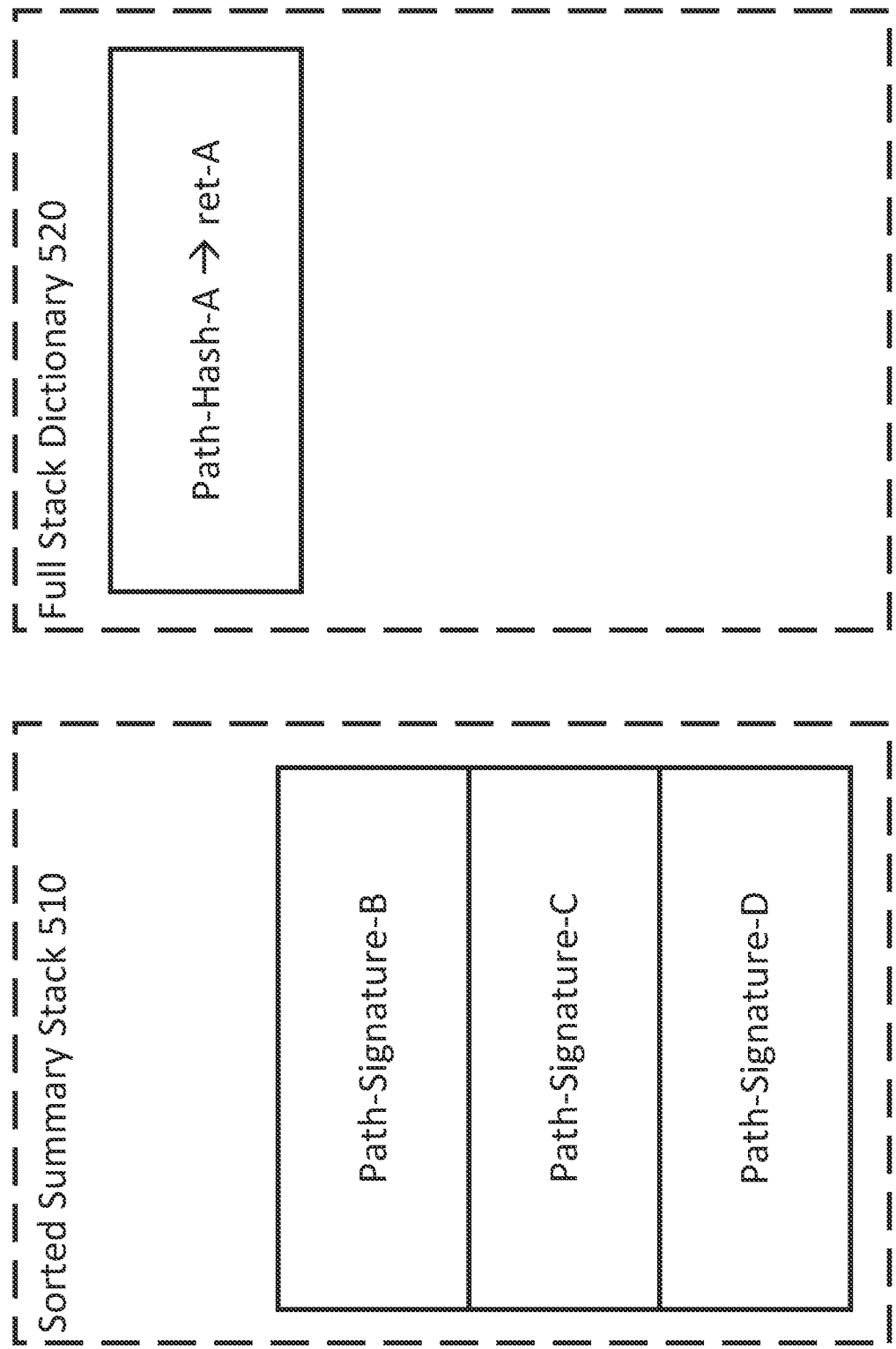
Figure 5C:
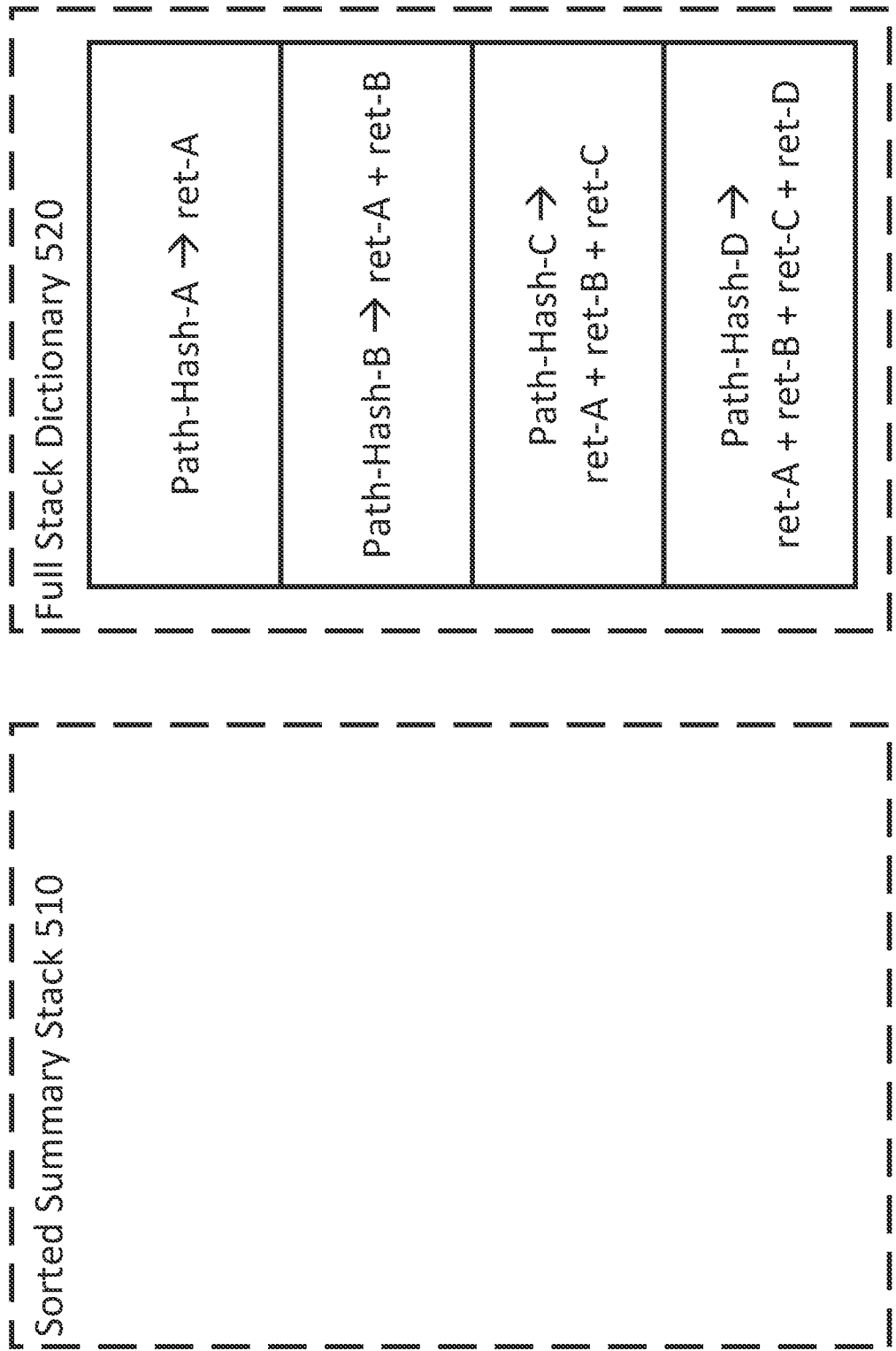

FIGS. 5A-5C are diagrams illustrating an example execution of blocks 302-310 of the example process 300, according to aspects of the disclosure. Summary stack 210 from FIGS. 2A-2D is sorted, according to block 304. Sorted summary stack 510 has four path signatures: path signature A, path signature B, path signature C, and path signature D. Full stack 520 is a data structure for storing the full stack information for each sampled call stack frame. Referring to FIGS. 2A-2D, four call stack frames are sampled in this example, one for each invocation of functions A, B, C, and D. Full stack 520 is initially empty.

FIG. 5B shows one iteration of the system executing blocks 306, 308, and 310. In other words, the system pops path signature A from the stack, and adds a key-value pair to the full stack 520. The key-value pair added includes the path hash from path signature A as the key and the top return address from path signature A as the value. The system iterates the execution of blocks 306, 308, and 310 until the sorted summary stack 510 is empty. FIG. 5C shows the empty summary stack 510 and the full stack 520 with four key-value pairs added.

Figure 5D:
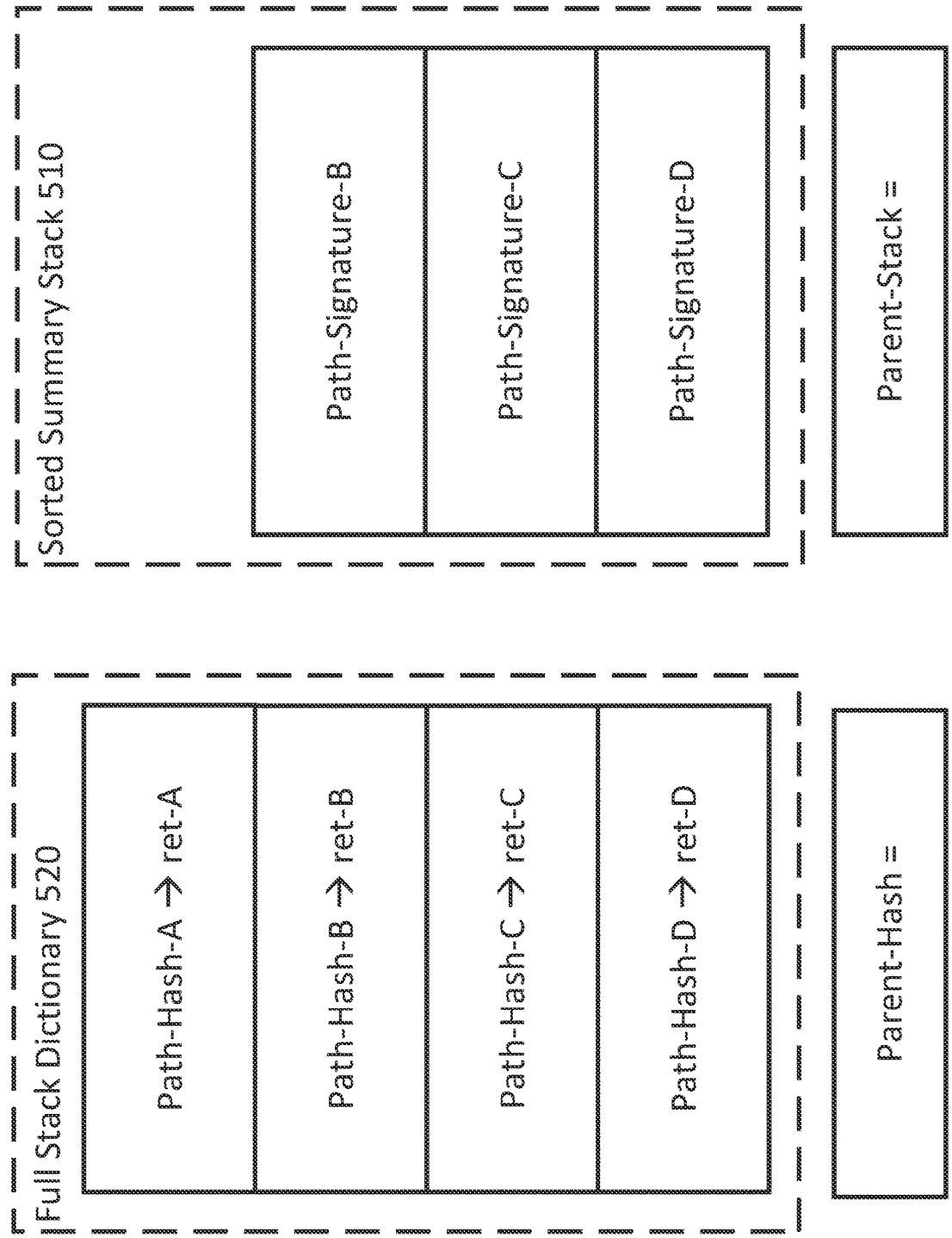
FIGS. 5D-5G are diagrams illustrating an example execution of blocks 312-326 of the example process 300.

FIGS. 5D-5G are diagrams illustrating an example execution of blocks 312-326 of the example process 300. FIG. 5D is a diagram showing the full stack 520, the sorted summary stack 510 with path signatures B, C, and D, a parent stack variable currently not set to any value, and a parent hash variable currently not set to any value. Path signature A is popped from the summary stack 510 because its depth is one and does not need to be unwound like the remaining signatures.

Figure 5E:
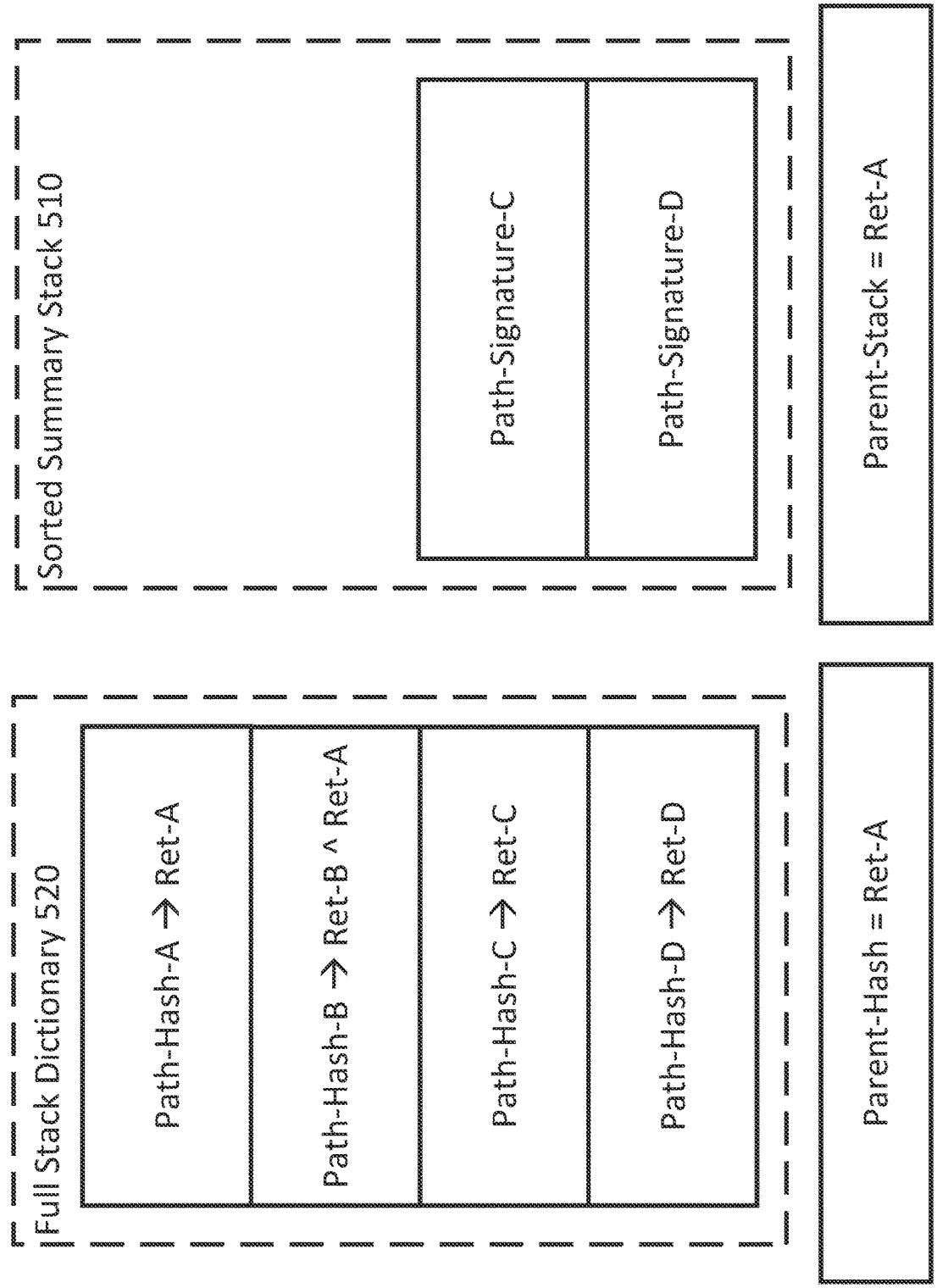

FIG. 5E is a diagram showing the full stack 520, the sorted summary stack 510, and the parent stack variable after one iteration of blocks 312-326 in the process 300. According to block 312, the current depth is set to 2. According to block 314, the system pops path signature B from the summary stack 510, as path signature B is the only signature matching the current depth of 2. The system sets the parent hash value to the output of performing an XOR between path hash B from path signature B and the top address B from path signature B. This operation can be represented by the following expression O:

$$\text{parent hash} = \text{hash}_B \oplus ret_B = (ret_A \oplus ret_B) \oplus ret_B = ret_A \qquad (O)$$

In expression O, $hash_B$ is the path hash from the path signature B $ret_B$, and $ret_A$ is the top address from path signature A. Because the XOR operation is associative and because the output of performing an XOR on an operand with itself is zero, the parent hash value simplifies to the top address of path signature A. This result is referred to as "unwinding" the hash by one frame.

According to block 318, the parent stack value is set to the value keyed by the full stack dictionary 520 at the key equal to the parent hash computed earlier. Referring to the full stack dictionary 520, the top address of path signature A ($ret_A$) is keyed to the path hash from path signature A. Therefore, the parent stack value is the top address of path signature A ($ret_A$).

According to block 320, the key-value pair with the key equal to the path hash in path signature B is set to have the value equal to the parent stack and the top address of in path signature B. Expression P is an example formulation of the key-value pair after update:

$$\text{dictionary}\{hash_B\} = ret_B + \text{parent stack} \quad (P)$$

In FIG. 5E, the full stack dictionary 520, the sorted summary stack 510, the parent hash, and the parent stack are updated to reflect the system's execution of one iteration of blocks 312-326. The system iterates through the process 300 for each signature with the same current depth. When the summary stack 520 no longer has any signatures matching the current depth, the system increments the current depth until the max depth is met.

Figure 5F:
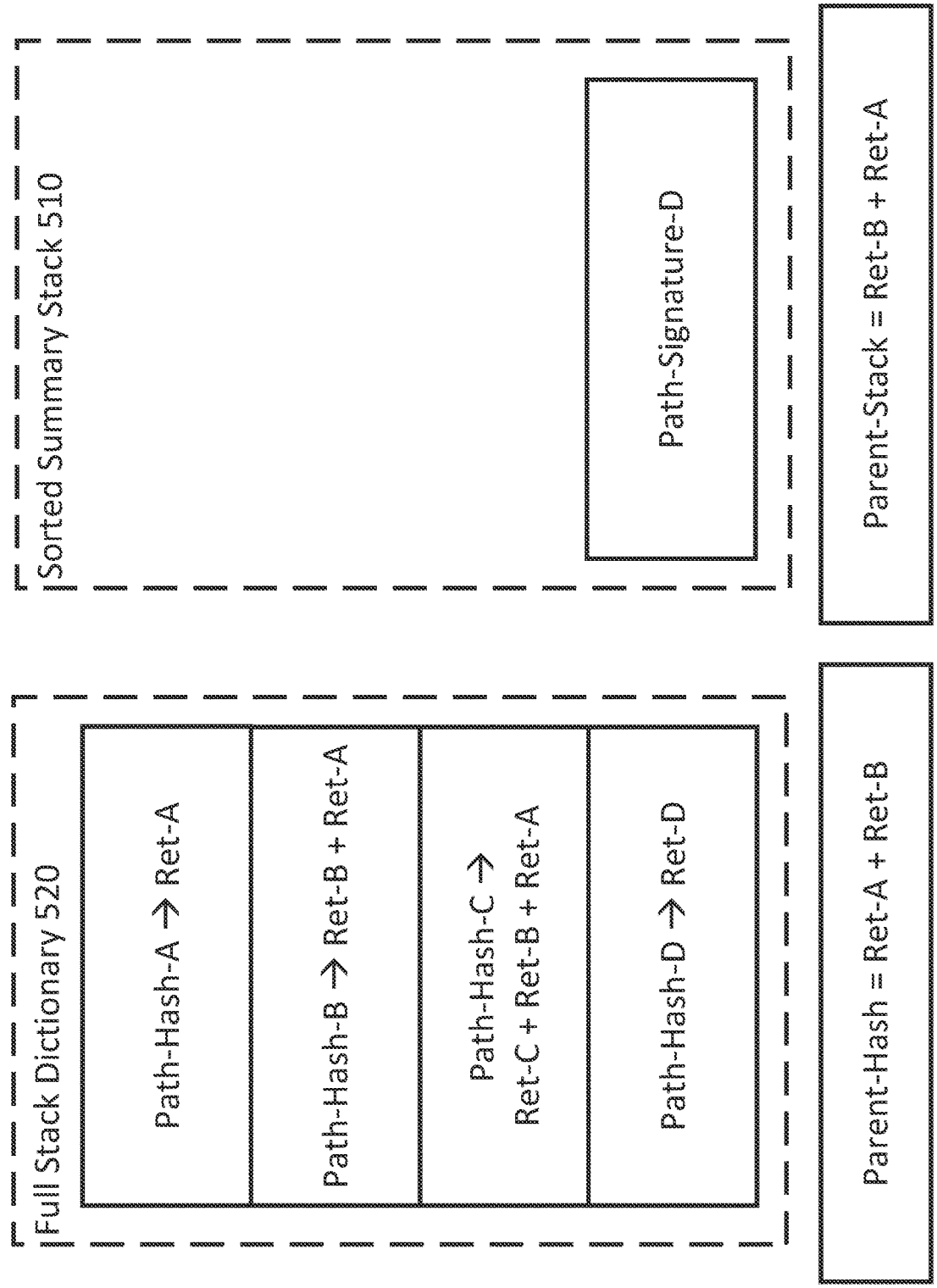

In FIG. 5F, the system pops path signature C and updates the path hash for path signature C in the full stack dictionary 520.

Figure 5G:
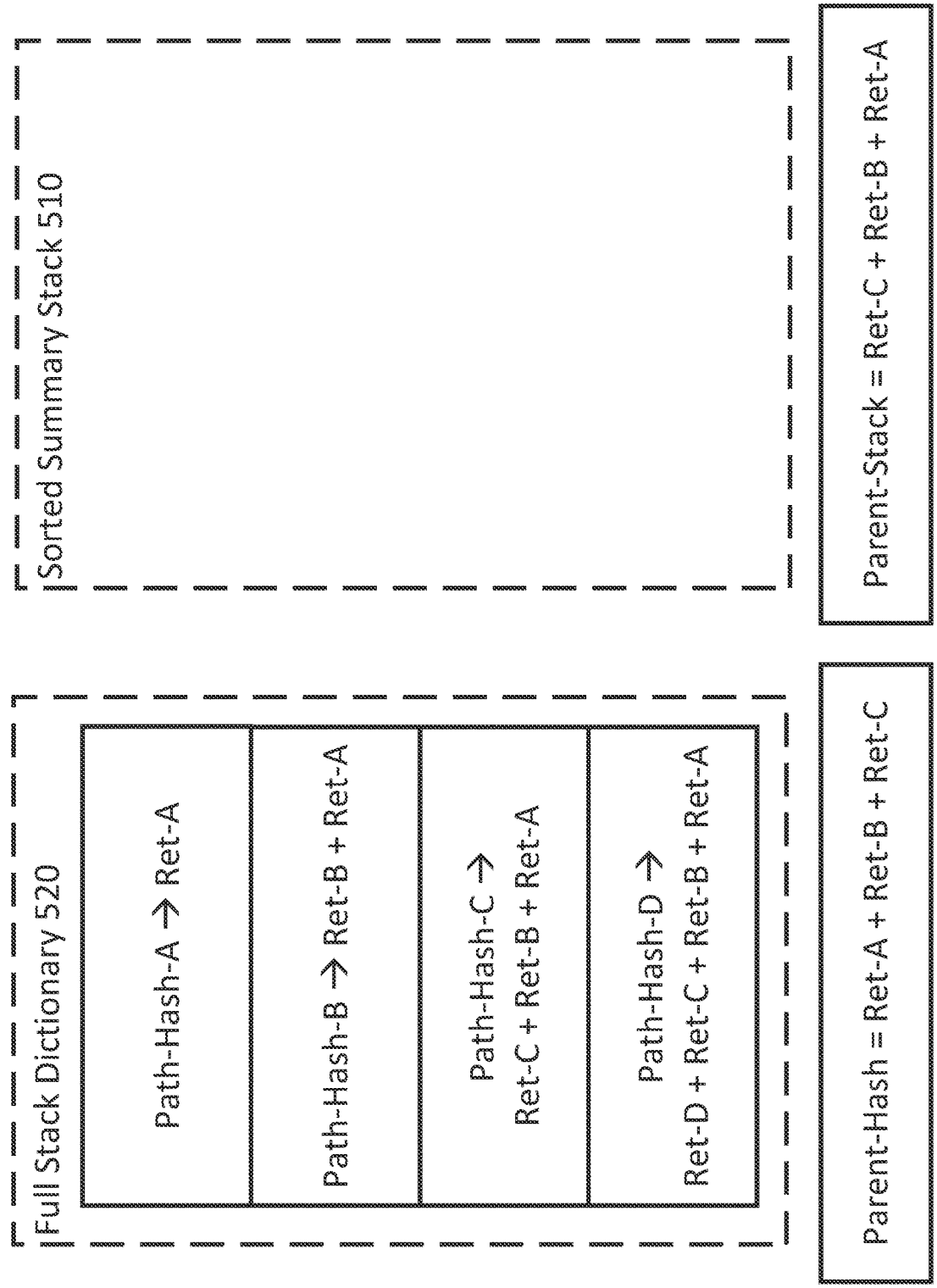

In FIG. 5G, the system pops path signature D and updates the path hash for path signature D in the full stack dictionary 520. Path signature D is updated.

One summary stack sample will exist for each frame in a profiled call stack. However, in some instances, some call paths, such as cold call path prefixes, may have no samples. In those instances, the missing samples may result in incomplete traces. To address this possibility, the profiler can be configured to enforce the condition that all ancestor or prefix call paths of a sampled frame be sampled at least once. For example, the profiler allocates the call path to a path table or other data structure.

As another example, when the system performs a look-up to the full_stacks data structure and finds no matching entry, the call edge corresponding to the current sample is constructed first. The system finds the caller node using the current return address of the path signature being processed, and the callee node is found using the program counter recorded in the sample. The system generates the static call graph from the computer program and traverses the graph to find the path, including the edge with the matching path hash.

Figure 6A:
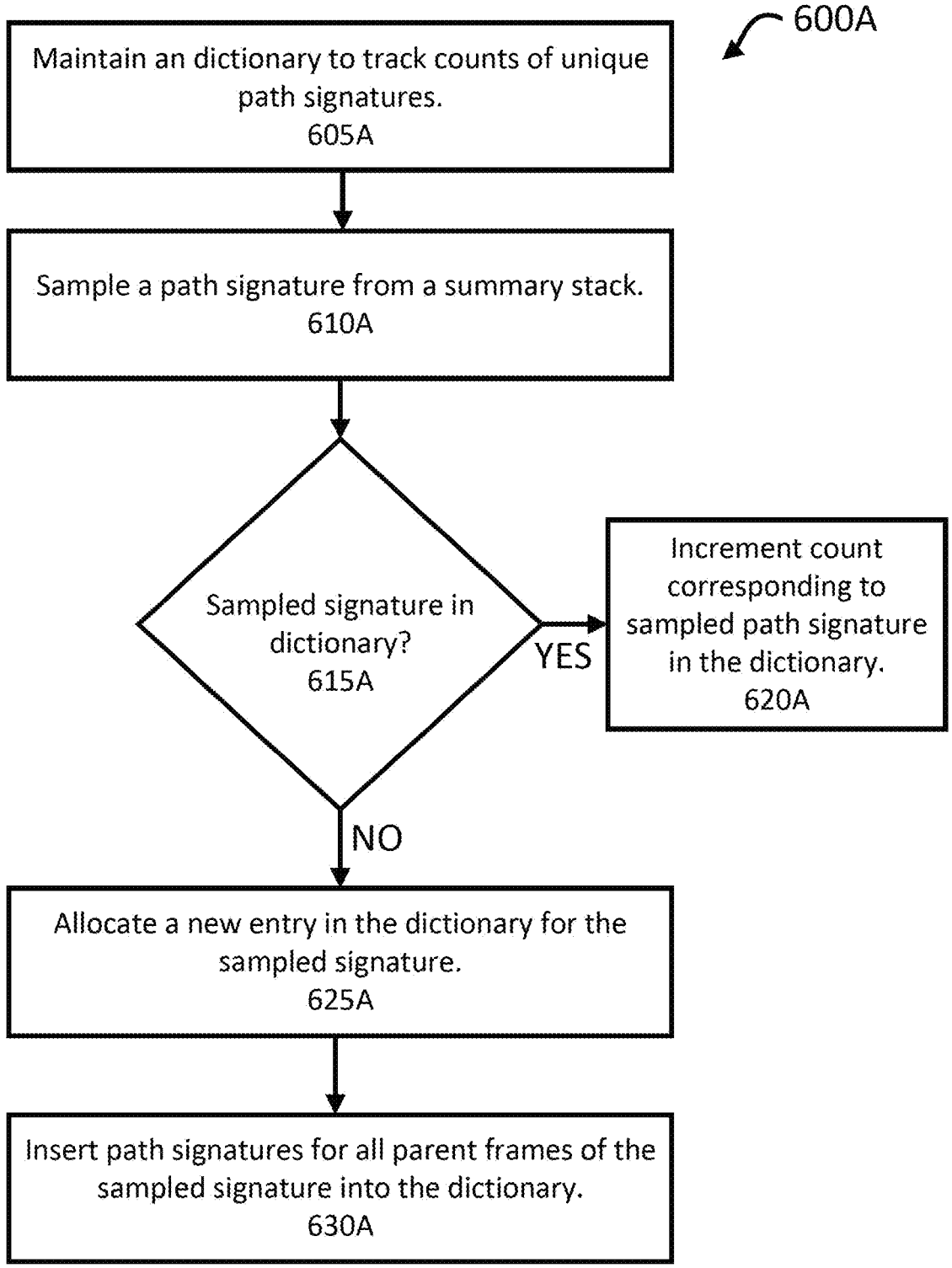
FIG. 6A is a flow diagram of an example online process for maintaining signatures along the call path of a sampled signature using a dictionary, according to aspects of the disclosure.

FIG. 6A is a flow diagram of an example online process 600A for maintaining signatures along the call path of a sampled signature using a dictionary, according to aspects of the disclosure. As described herein with reference to process 600A, path signatures are retrieved and stored in a dictionary so that the system can retrieve corresponding call frames. A full stack walk through a call path refers to retrieving the call path signature for each call frame in a call path leading to a sampled call frame. By storing signatures in a dictionary, the system can query the dictionary in an offline process, e.g., as shown and described in FIGS. 3A-B. The system maintains a dictionary to track counts of unique path signatures, according to block 605A.

The system samples a path signature from a summary stack, according to block 610A.

The system determines whether the sampled signature is in the dictionary, according to decision block 615A. If so ("YES"), the system increments the count corresponding to the sampled path signature in the dictionary, according to block 620A. If not ("NO"), the system can proceed to allocating a new entry in the dictionary for the sampled signature, according to block 625A.

According to block 630A, the system inserts path signatures for all parent frames of the sampled signature into the dictionary. Put another way, the system walks through the call path of the call frame corresponding to the sampled signature. For example, if the sampled path signature corresponds to stack frame D, and the call path to stack frame D is A to B to C to D, then the system inserts the call path signatures for frames A, B, and C, once. Afterwards, if another call path signature is sampled that includes the same frames in its call path, the system can retrieve the corresponding path signatures from the dictionary and increment the count instead of performing another path walk. Even the same call stack has many samples, the full stack only only has to be performed once.

Figure 6B:
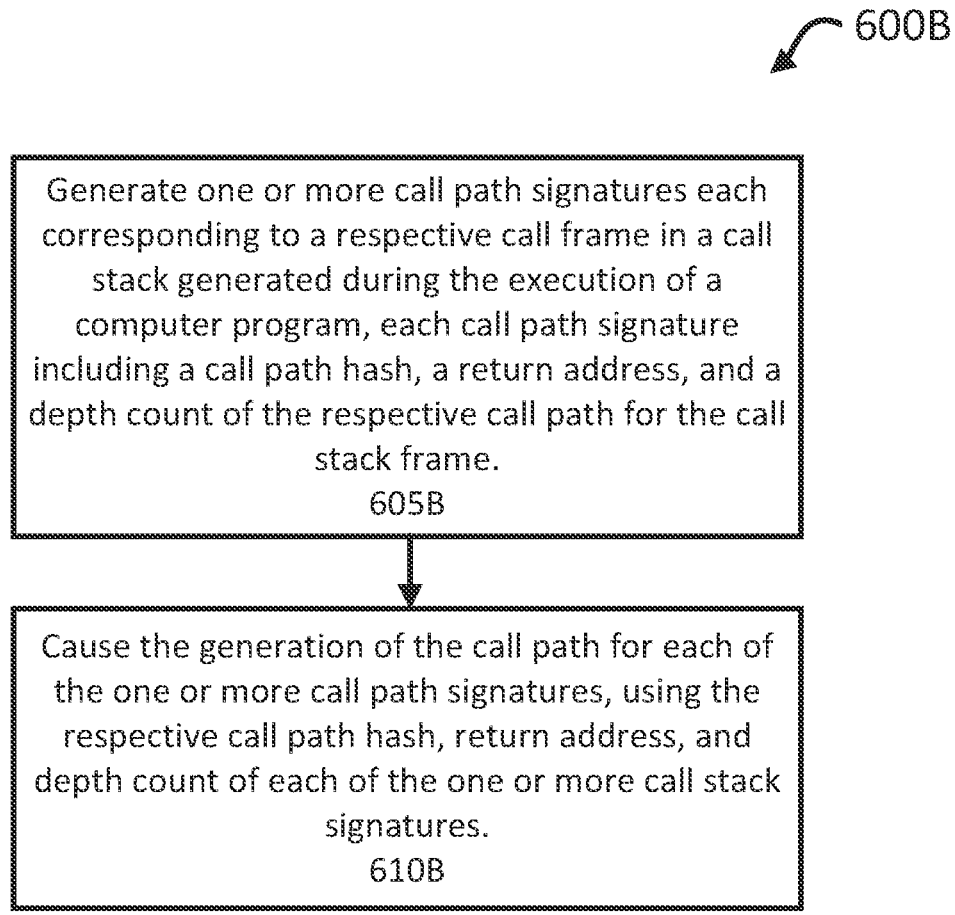
FIG. 6B is a flow diagram of an example process of generating call path signatures, according to aspects of the disclosure.

FIG. 6B is a flow diagram of an example process 600B for generating call path signatures, according to aspects of the disclosure.

A system generates one or more call path signatures each corresponding to a respective call frame in a call stack generated during the execution of a computer program, each call path signature including a call path hash, a return address, and a depth count of the respective call path for the call stack frame, according to block 605B.

In generating the one or more call path signatures, the system is configured to generate the one or more call path signatures during the execution of the computer program.

The system causes the generation of the call path for each of the one or more call path signatures, using the respective call path hash, return address, and depth count of each of the one or more call stack signatures, according to block 610B.

In causing the generation of the call path for each of the one or more call path signatures, the system is configured to cause the generation of the call path for each of the one or more call path signatures after the execution of the computer program. The system can be further configured to maintain the call path hash of the top-most call stack frame in the call stack in memory; and generate a call path signature using the call path hash maintained in memory.

The system can be further configured to retrieve the return address and the depth count of a call stack frame from a shadow stack, wherein the shadow stack is a hardware-implemented stack maintained independently of the call stack.

Example Computing Environment

FIG. 7 is a block diagram of an example computing environment 700 including a sampler/profiler system 100, according to aspects of the disclosure. The system 100 can be implemented on one or more devices having one or more processors in one or more locations, such as in server computing device 715. User computing device 712 and the server computing device 715 can be communicatively coupled to one or more storage devices 730 over a network 760. The storage device(s) 730 can be a combination of volatile and non-volatile memory and can be at the same or different physical positions than the computing devices 712, 715. For example, the storage device(s) 730 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 715 can include one or more processors 713 and memory 714. The memory 714 can store information accessible by the processor(s) 713, including instructions 721 that can be executed by the processor(s) 713. The memory 714 can also include data 723 that can be retrieved, manipulated, or stored by the processor(s) 713. The memory 714 can be a type of non-transitory computer readable medium capable of storing information accessible by the processor(s) 713, such as volatile and non-volatile memory. The processor(s) 713 can include one or more central processing units (CPUs), graphic processing units (GPUs), field-programmable gate arrays (FPGAs), and/or application-specific integrated circuits (ASICs), such as tensor processing units (TPUs).

The instructions 721 can include one or more instructions that when executed by the processor(s) 713, causes the one or more processors to perform actions defined by the instructions. The instructions 721 can be stored in object code format for direct processing by the processor(s) 713, or in other formats including interpretable scripts or collections of independent source code modules that are interpreted on demand or compiled in advance. The instructions 721 can include instructions for implementing the system 100 and/or the platform 101 consistent with aspects of this disclosure. The system 100 and/or platform 101 can be executed using the processor(s) 713, and/or using other processors remotely located from the server computing device 715.

The data 723 can be retrieved, stored, or modified by the processor(s) 713 in accordance with the instructions 721. The data 723 can be stored in computer registers, in a relational or non-relational database as a table having a plurality of different fields and records, or as JSON, YAML, proto, or XML documents. The data 723 can also be formatted in a computer-readable format such as, but not limited to, binary values, ASCII, or Unicode. Moreover, the data 723 can include information sufficient to identify relevant information, such as numbers, descriptive text, proprietary codes, pointers, references to data stored in other memories, including other network locations, or information that is used by a function to calculate relevant data.

The user computing device 712 can also be configured like the server computing device 715, with one or more processors 716, memory 7175, instructions 718, and data 719. The user computing device 712 can also include a user output 726, and a user input 724. The user input 724 can include any appropriate mechanism or technique for receiving input from a user, such as keyboard, mouse, mechanical actuators, soft actuators, touchscreens, microphones, and sensors. The user computing device 712 can be part of or implement the system 100, which may include one or more other devices.

The server computing device 715 can be configured to transmit data to the user computing device 712, and the user computing device 712 can be configured to display at least a portion of the received data on a display implemented as part of the user output 726. The user output 726 can also be used for displaying an interface between the user computing device 712 and the server computing device 715. The user output 726 can alternatively or additionally include one or more speakers, transducers or other audio outputs, a haptic interface or other tactile feedback that provides non-visual and non-audible information to the user of the user computing device 712.

Although FIG. 7 illustrates the processors 713, 716 and the memories 714, 715 as being within the computing devices 715, 712, components described in this specification, including the processors 713, 716 and the memories 714, 715 can include multiple processors and memories that can operate in different physical positions and not within the same computing device. For example, some of the instructions 721, 718 and the data 723, 719 can be stored on a removable SD card and others within a read-only computer chip. Some or all the instructions and data can be stored in a position physically remote from, yet still accessible by, the processors 713, 716. Similarly, the processors 713, 716 can include a collection of processors that can perform concurrent and/or sequential operation. The computing devices 715, 712 can each include one or more internal clocks providing timing information, which can be used for time measurement for operations and programs run by the computing devices 715, 712.

The server computing device 715 can be configured to receive requests to process data from the user computing device 712. For example, the environment 700 can be part of a computing platform configured to provide a variety of services to users, through various user interfaces and/or APIs exposing the platform services.

The devices 712, 715 can be capable of direct and indirect communication over the network 760. The devices 715, 712 can set up listening sockets that may accept an initiating connection for sending and receiving information. The network 760 itself can include various configurations and protocols including the Internet, World Wide Web, intranets, virtual private networks, wide area networks, local networks, and private networks using communication protocols proprietary to one or more companies. The network 760 can support a variety of short- and long-range connections. The short- and long-range connections may be made over different bandwidths, such as 2.402 GHZ to 2.480 GHZ (commonly associated with the Bluetooth® standard), 2.4 GHz and 5 GHz (commonly associated with the Wi-Fi® communication protocol); or with a variety of communication standards, such as the LTE® standard for wireless broadband communication. The network 760, in addition or alternatively, can also support wired connections between the devices 712, 715, including over several types of Ethernet connection.

Although a single server computing device 715 and user computing device 712, are shown in FIG. 7, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform 101 and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many implementations. Further, the same reference numbers in different drawings can identify the same or similar elements.

The invention claimed is:

1. A system comprising one or more processors, the one or more processors configured to:
    receive one or more call path signatures, each call path signature corresponding to a respective call stack frame of a call stack and comprising a call path hash value;
    sample the one or more call path signatures during an execution of a computer program using the call stack while receiving the one or more call path signatures;
    sort the one or more call path signatures according to depth of the call path for each call stack frame corresponding to a received call path signature; and
    for each of the sorted one or more call path signatures:
        generate a parent call path hash value using a return address of a call stack frame and a call path hash value in the call path signature,
        generate, using the parent call path hash value, a parent call path for a parent call stack frame appearing before the call stack frame in the call path, and
        generate a call path for the call stack frame using the parent call path and the return address of the respective call stack frame.

2. The system of claim 1, wherein the call path hash value is generated using the return address of the respective call stack frame and return addresses of call stack frames in the call path in the call stack leading to the respective call stack frame.

3. The system of claim 1, wherein the one or more processors are configured to generate the call stack for each of the one or more sorted call path signatures beginning with the call path signature corresponding to the call stack frame with the smallest call stack depth.

4. The system of claim 1, wherein the call path hash value is generated using a hash function with a property of being able to be unwound using the return address of a call stack frame.

5. The system of claim 1, wherein a call path signature comprises:
    the call path hash value for the respective call stack frame;
    the return address of the respective call stack frame; and
    a depth count corresponding to the depth of the call path leading to the respective call stack frame.

6. The system of claim 1, wherein the one or more processors are configured to generate the call stack for each of the one or more call path signatures during or after the execution of the computer program.

7. The system of claim 1, wherein the one or more call path signatures are each stored as a tuple of values with a predetermined maximum memory requirement.

8. The system of claim 1, wherein the one or more call path signatures are generated using return addresses maintained by a shadow stack, wherein a shadow stack is a copy of the call stack maintained in hardware.

9. A method comprising:
    receiving, by one or more processors, one or more call path signatures, each call path signature corresponding to a respective call stack frame of a call stack and comprising a call path hash value;
    sampling, by the one or more processors, the one or more call path signatures during an execution of a computer program using the call stack while receiving the one or more call path signatures;
    sorting, by the one or more processors, the one or more call path signatures according to a depth of the call path for each call stack frame corresponding to a received call path signature; and
    for each of the sorted one or more call path signatures:
        generating, by the one or more processors, a parent call path hash value using a return address and a call path hash value in the call path signature,
        generating, by the one or more processors, using the parent call path hash value, a parent call path for a parent call stack frame appearing before the call stack frame in the call path, and
        generating, by the one or more processors, a call path for the call stack frame using the parent call path and the return address of the respective call stack frame.

10. The method of claim 9, wherein the call path hash value is generated using the return address of the respective call stack frame and return addresses of call stack frames in the call path in the call stack leading to the respective call stack frame.

11. The method of claim 9, further comprising:
    generating, by the one or more processors, the call stack for each of the one or more sorted call path signatures beginning with the call path signature corresponding to the call stack frame with the smallest call stack depth.

12. The method of claim 9, wherein the call path hash value is generated using a hash function with a property of being able to be unwound using the return address of a call stack frame.

13. The method of claim 9, wherein a call path signature comprises:
    the call path hash value for the respective call stack frame;
    the return address of the respective call stack frame; and
    a depth count corresponding to the depth of the call path leading to the respective call stack frame.

14. The method of claim 9, further comprising generating, by the one or more processors, the call stack for each of the one or more call path signatures during or after the execution of the computer program.

15. The method of claim 9, wherein the one or more call path signatures are each stored as a tuple of values with a predetermined maximum memory requirement.

16. One or more non-transitory computer-readable storage media, comprising instructions that when executed by one or more processors, causes the one or more processors to perform operations comprising:
    receiving one or more call path signatures, each call path signature corresponding to a respective call stack frame of a call stack and comprising a call path hash value;
    sampling the one or more call path signatures during an execution of a computer program using the call stack while receiving the one or more call path signatures;
    sorting the one or more call path signatures according to a depth of the call path for each call stack frame corresponding to a received call path signature; and
    for each of the sorted one or more call path signatures:
        generating a parent call path hash value using a return address and a call path hash value in the call path signature,
        generating, using the parent call path hash value, a parent call path for a parent call stack frame appearing before the call stack frame in the call path, and
        generating a call path for the call stack frame using the parent call path and the return address of the respective call stack frame.

17. The one or more computer-readable storage media of claim 16, wherein the operations further comprise generating the call stack for each of the one or more sorted call path signatures beginning with the call path signature corresponding to the call stack frame with the smallest call stack depth.

18. The one or more computer-readable storage media of claim 16, wherein the call path hash value is generated using a hash function with the property of being able to be unwound using the return address of a call stack frame.

* * * * *